United States Patent [19]
Littman

[11] 3,966,121
[45] June 29, 1976

[54] DOWNSPOUT EXTENSION

[75] Inventor: Bruce A. Littman, Highland Park, Ill.

[73] Assignee: Benson Mfg. Corporation, Menomonee Falls, Wis.

[22] Filed: May 22, 1975

[21] Appl. No.: 580,100

[52] U.S. Cl. .............................. 239/197; 239/208; 239/547
[51] Int. Cl.² .......................................... B05B 1/14
[58] Field of Search .......... 239/195, 197, 208, 269, 239/289, 547; 138/118, 119, 178, 128, DIG. 8; 267/156, 59

[56] References Cited
UNITED STATES PATENTS

| | | | |
|---|---|---|---|
| 2,814,529 | 11/1957 | Arnt | 239/197 X |
| 2,898,939 | 8/1959 | Fox | 239/208 X |
| 3,035,779 | 5/1962 | Convis | 239/208 |

FOREIGN PATENTS OR APPLICATIONS

| | | | |
|---|---|---|---|
| 181,882 | 12/1962 | Sweden | 138/119 |

Primary Examiner—John J. Love
Attorney, Agent, or Firm—Wheeler, Morsell, House & Fuller

[57] ABSTRACT

A coilable downspout drain extension includes an elongated tube formed from two opposed tube portions fastened together by heat-sealed seams on the side edges. Second heat-sealed seams located inwardly of the first seams define channels for receiving spring strips which cause the extension to coil when not in use. A flexible sleeve formed from the tube portion and extending past the termination of the spring strips is easily connected to the downspout by a flexible strap and buckle.

3 Claims, 2 Drawing Figures

DOWNSPOUT EXTENSION

BACKGROUND OF INVENTION

The invention relates to a gutter downspout extension adapted to disperse water uniformly over a large area away from the house. The invention is an improvement over the downspout extension shown in U.S. Pat. No. 2,814,529.

SUMMARY OF INVENTION

The invention provides a coilable downspout extension which has a flexible sleeve portion extending from the main tube and free of the spring strips and which is easily attached to the downspout by a strap. A flexible and deformable foam rubber seal is located inside the sleeve and firmly secured by the strap. Sheet metal clamps such as that shown in the Arnt U.S. Pat. No. 2,814,529 are difficult to manipulate to connect the extension to the downspout and also have strap edges which can cuase injury. With the present invention the spring strips terminate below the connecting sleeve and thus, the sharp edges of the ends of the spring are not easily engaged by the hands during assembly on the downspout. The use of the strap greatly facilitates assembly of the extension on the downspout.

Further objects, advantages and features of the invention will become apparent from the following disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
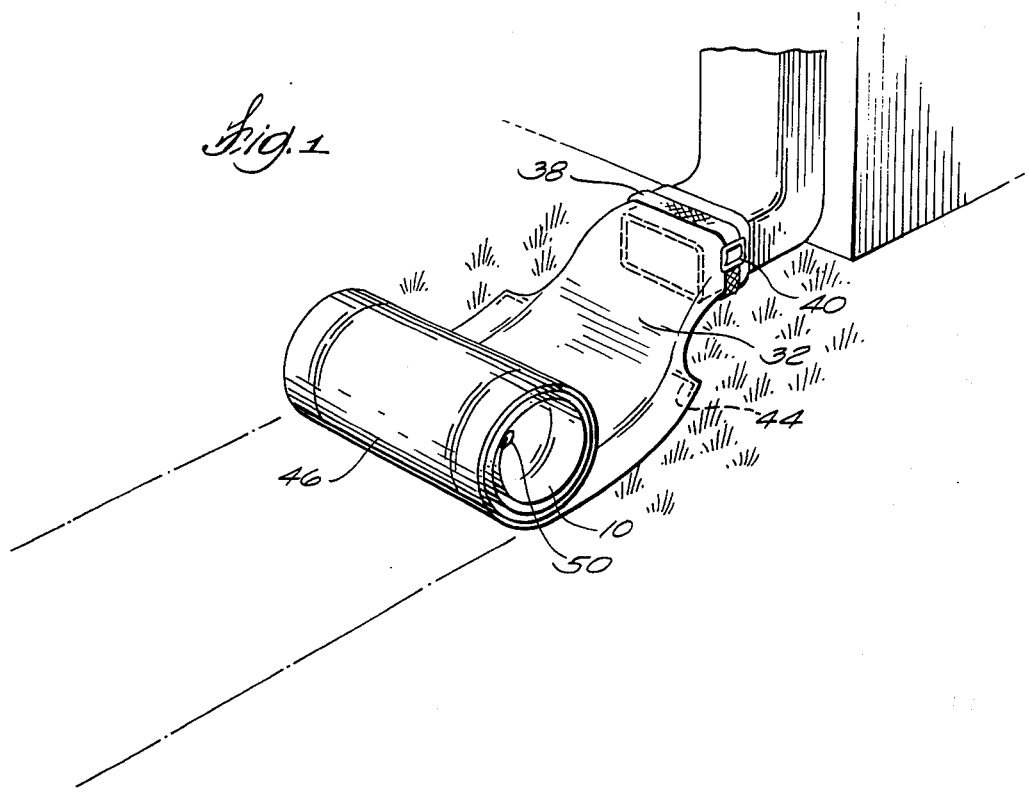
FIG. 1 is a perspective view of a downspout extension in accordance with the invention.
Figure 2:
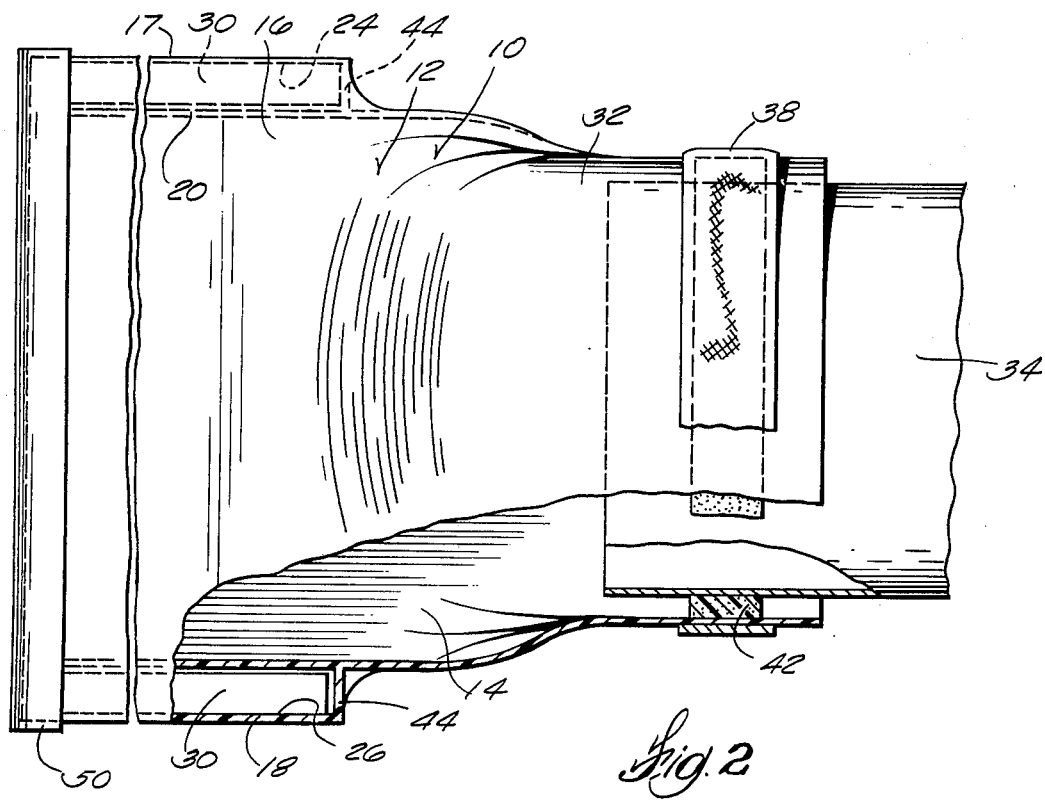
FIG. 2 is an enlarged plan view of the downspout extension shown in FIG. 1.

In the drawings FIG. 1 shows a downspout extension 10 which includes a tube 12 formed from upper and lower layers 14, 16 which are heat sealed together along first seams 17 and 18 along the side edges of the tube.

Second heat sealed seams 20 and 22 are spaced inwardly from the seams 17, 18 and provide enclosed channels 24, 26 which receive spring strips 30 which cause the extension to coil as shown in FIG. 1, when not filled with water.

To facilitate connection of the downspout extension the tube has an integral sleeve portion 32 which extends from he tube body at the point where the springs 30 terminate. The sleeve portion 32 thus, is flexible without interference from the springs and is easily slipped over the end 34 of the downspout. The sleeve is easily secured to the downspout end 34 by a flexible strap 38 provided with a buckle 40. A foam rubber ring 42 is clamped against the downspout end 34 to provide a water tight seal. The sleeve has sufficient length so that the sharp edges of the springs 30 are not engaged by the user. However, seams 44 enclose the ends of channels 24, 26 to prevent injury.

The tube can be provided with water dispersion apertures 46 scattered along the length of the body portion. A spring clamp 50 can be provided to seal the remote end of the tube 12.

I claim:

1. A downspout extension comprising an elongated tube body, said tube being formed from two opposed tube portions, said tube portions being connected together along their edges by first longitudinal seams, second longitudinal seams spaced inwardly from said side edges to form a central water conduit, apertures in said tube portions to form water outlets, and said first seams cooperating with said second seams to form channels transverse seams closing one end of each of said channels, spring strips located in said channels to cause said tube to wind into a coil, said tube including a downspout connecting sleeve said sleeve being formed by said two opposed tube portions and said second longitudinal seams to form a flexible connecting sleeve free of said springs and extending from said transverse seams for attachment to the downspout, and clamping means for securing said sleeve to the downspout.

2. A downspout extension in accordance with claim 1 wherein said clamping means comprises a flexible strap with a strap fastener for adjustably connecting the ends of the strap.

3. Apparatus in accordance with claim 1 including a flexible and yieldable seal for sealing the inside of said sleeve portion to said downspout.

* * * * *